United States Patent
Schroeder et al.

[11] Patent Number: 5,856,727
[45] Date of Patent: Jan. 5, 1999

[54] MULTI-PURPOSE SAFETY LIGHT

[75] Inventors: Charles R. Schroeder, Shelton; Scott Gelormino, Winsted; Serafino Canino, Torrington, all of Conn.

[73] Assignee: ICC Corporation, Torrington, Conn.

[21] Appl. No.: 697,980

[22] Filed: Sep. 4, 1996

[51] Int. Cl.$^6$ .................................................. H01J 7/44
[52] U.S. Cl. ................ 315/55; 315/200 A; 315/209 PZ; 362/72; 362/800; 310/311; 310/317; 310/329
[58] Field of Search .................................. 315/55, 56, 61, 315/200 A, 209 PZ; 310/311, 314, 317, 329; 362/72, 158, 191, 276, 800

[56]  References Cited

U.S. PATENT DOCUMENTS

| | | | |
|---|---|---|---|
| 3,558,938 | 1/1971 | Good | 315/55 X |
| 4,176,390 | 11/1979 | Galbert | 362/72 |
| 4,294,105 | 10/1981 | Kelly | 73/28 |
| 5,333,101 | 7/1994 | McEvoy | 362/72 |
| 5,523,644 | 6/1996 | Witehira | 310/329 |
| 5,624,175 | 4/1997 | Gelormino et al. | 362/72 |

Primary Examiner—Robert Pascal
Assistant Examiner—Haissa Philogene
Attorney, Agent, or Firm—Handal & Morofsky

[57]  ABSTRACT

A motion activated and light sensitive multi-purpose safety light, having a housing for supporting: a motion sensor; a light emitting diode which serves as both a light source and a light detector; an electronic circuit which further comprises; a motion sensor amplifier to condition the motion signal received from the motion sensor, a driver for illuminating the light emitting diode in a flashing manner, a timer enabling the operation of the driver and a photo-amplifier providing amplification of the input signal received from the light emitting diode. A user-selected control components for providing parameters relating to the conditioning and the flash rate. A printed circuit board providing an area to mount the electrical components and electric circuit and a system power source.

33 Claims, 5 Drawing Sheets

MULTI-PURPOSE SAFETY LIGHT

TECHNICAL FIELD

The present invention relates to a safety light intended to make the location of people, animals, or objects more apparent under low light or bad weather conditions.

BACKGROUND

Many injuries have occurred due to poor night time visibility. In an attempt to alleviate this problem various devices have been proposed to give visible notice of one's presence under low light situations. These devices include, for example, various forms of reflectors, and steady and flashing lights which are attached to people, animals or objects. For example, a person running on the side of a road at night may wear a device which incorporates a reflector or flashing light in an attempt to be more visible to passing motorists. Likewise, such a device may be attached to a collar of a dog or to a surface on a bicycle frame enhancing the likelihood of visual detection. Such devices can increase visibility during daylight hours as well as at night. In the past, however, designs have fallen short of their intended purpose: to dependably and effectively increase detection of the person, animal, or object to which the device is attached.

Reflectors, for example, since they are dependent on an external light source, will fail in the situation where a motorist approached an intersection and, after stopping, makes a right turn without noticing a bicyclist who had come up alongside the motorist. Also, reflectors often lead to confusion. If there are numerous lights in close proximity at an intersection, a reflector as a light source may be mistaken as another motorist traveling at the speed of traffic or a stationary light along the roadside, depending on the motorist's perception. Both situations may lead to serious physical injury to the motorist and bicyclist.

Other indicators rely on various moving parts which are subject to wear and fatigue resulting in failure. For example, one design for a bike requires a generator to supply power to a light source mounted on the bike. The generator is activated by bringing one end of the generator rotor in physical contact with the bike tire or wheel. As the wheel turns the generator produces power for the light source. Since the generator is physically touching the tire or wheel, wear to the tire or wheel occurs which may ultimately lead to wheel failure. Additionally, since the generator and the light source are typically mounted in separate areas, a conductor to carry power to the light must be used. In operation, a bike is subjected to environmental elements resulting in dirt and moisture, and vibration invading the electrical connections leading to failure due to corrosion or wire breakage. While battery powered devices may solve some of these problems, batteries are expensive, wear out, and are hazardous to the environment.

SUMMARY OF THE INVENTION

The present invention, as claimed, is intended to provide a remedy. It solves the problem of how to provide for a more dependable and effective visual indication of the presence of an individual, pet or object, under low light or bad weather conditions, utilizing design techniques which minimize failure due to environmental conditions, while maximizing reliability. At the same time the inventive system combines the dependability of a battery powered system with long battery life and freedom from failure of mechanical parts.

The inventive safety light comprises a housing, a motion sensor, an electronic circuit, a system power source, and various discrete electrical components. The electronic circuit is further comprised of a motion sensor amplifier, a timer, a light emitting diode (LED) output driver, and a photo-amplifier.

In accordance with the preferred embodiment of the present invention, when motion is detected by the motion sensor a signal is provided to the motion sensor amplifier portion of the electronic circuit, causing the device to be triggered and have a blinking light output. This blinking light output consumes a minimal amount of power. Power saving is enhanced by operation only while the device is moving, thus maintaining battery life. The motion sensor amplifier provides signal conditioning by amplifying and filtering the signal prior to passing the signal to the timer portion of the electric circuit. The timer is a monostable multivibrator, triggered by the output of the motion sensor amplifier, which enables the LED output driver. The LED driver, when enabled, functions as an astable multivibrator which, in turn, illuminates the LED devices.

The LED devices also operate as an ambient light detector. When light hits the LED devices a voltage is produced which, after amplification, is provided as a disabling input to the timer portion of the electronic circuit. This prevents battery drain under well-illuminated conditions.

Thus, only in the absence of light, when motion is detected by the motion sensor, LED devices are illuminated in a flashing manner by the LED driver for a given time period defined by the timer. The LED devices thus have a dual function, serving as blinking light sources and as ambient light detectors. The time period is defined by selecting particular discrete electrical components which form a simple resistive-capacitive timing circuit. In similar fashion, the rate and period of the LED flash are user-controlled.

In accordance with the preferred embodiment, the housing is sealed from the external environment. The LED devices, however, may be located inside, outside, or on the exterior of the housing.

To further minimize reliability problems the electronic circuit of the preferred embodiment is fabricated as an application specific integrated circuit (ASIC) device. An ASIC design minimizes reliability problems by reducing the number of electrical components needed and their associated connections. An ASIC design also provides a more suitable operating environment separate from that which exists external to the ASIC circuit. Additionally, since the motion sensor is not dependant on items external to the inventive design, the motion sensor can be mounted adjacent to the ASIC electronic circuit reducing lead length and problems such as electrically induced noise, corrosion, and excess vibration.

The use of an ASIC design along with other power-saving techniques reduces the power requirements of the inventive design such that, like the motion sensor, the small power source size allows for mounting adjacent to the ASIC electronic circuit.

In addition to providing a compact design reducing power requirements and restricting the environmental effects on the design, the preferred embodiment of the present invention incorporates a series of flashing LED devices. Utilizing a flashing LED device signal rather than a static LED device signal enhances the likelihood of the person, animal, or object, which the inventive design is attached, to be visually detected.

BRIEF DESCRIPTION OF THE DRAWINGS

One way of carrying out the invention is described in detail below with reference to drawings which illustrate a specific embodiment of the invention.

DETAILED DESCRIPTION OF THE PREFERRED EMBODIMENTS

Figure 1:
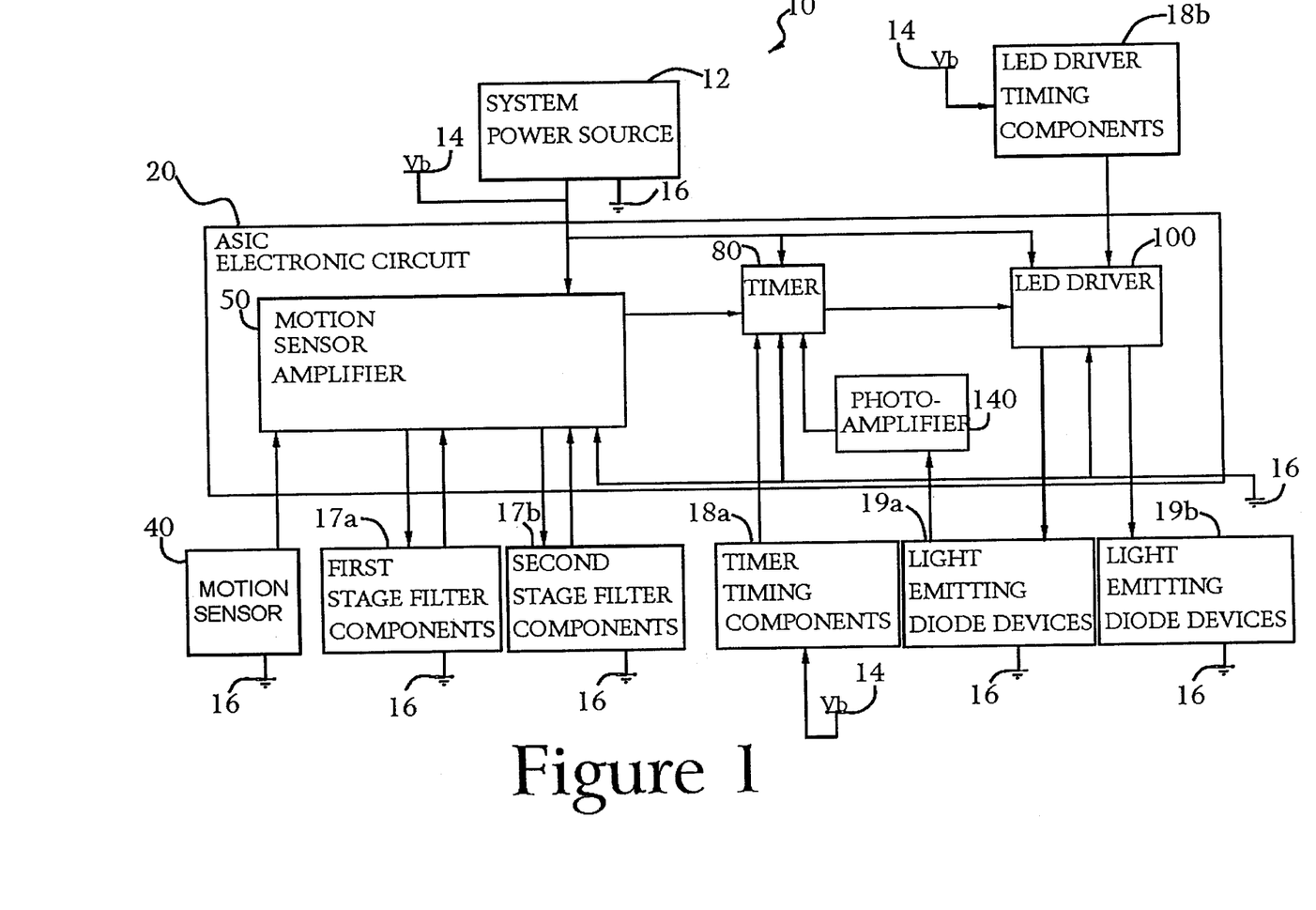
FIG. 1 is a block diagram of an exemplary embodiment of a motion sensing and blinking device constructed in accordance with the present invention.
Figure 2:
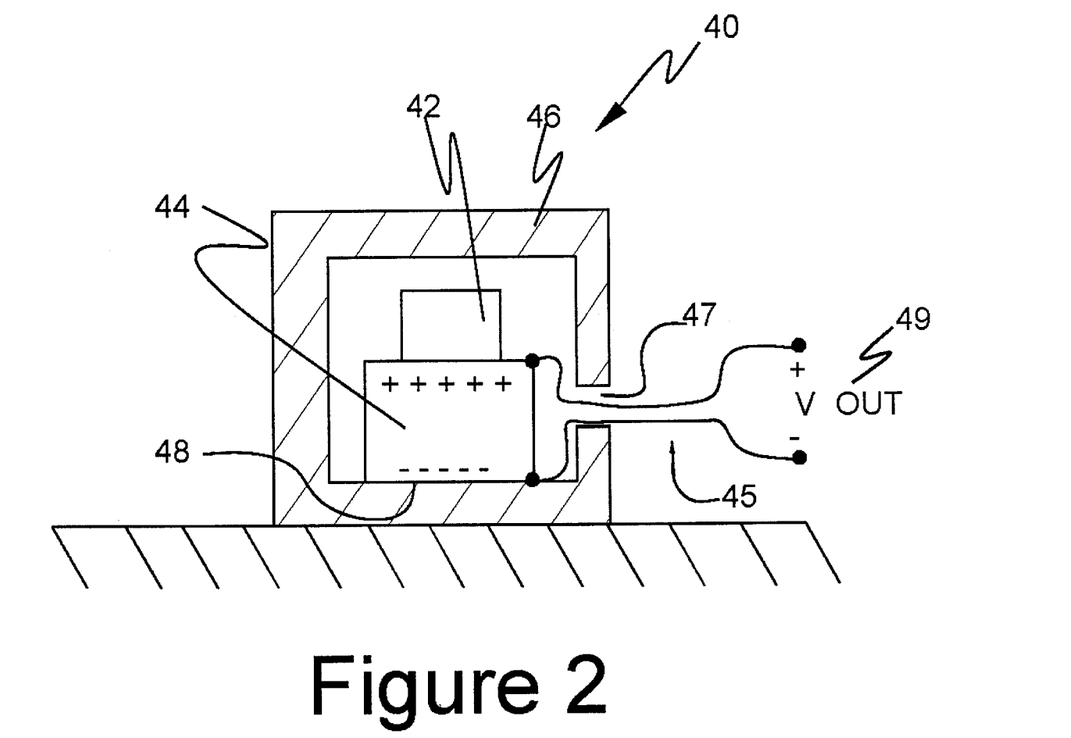
FIG. 2 is a schematic diagram of the motion sensor.
Figure 3:
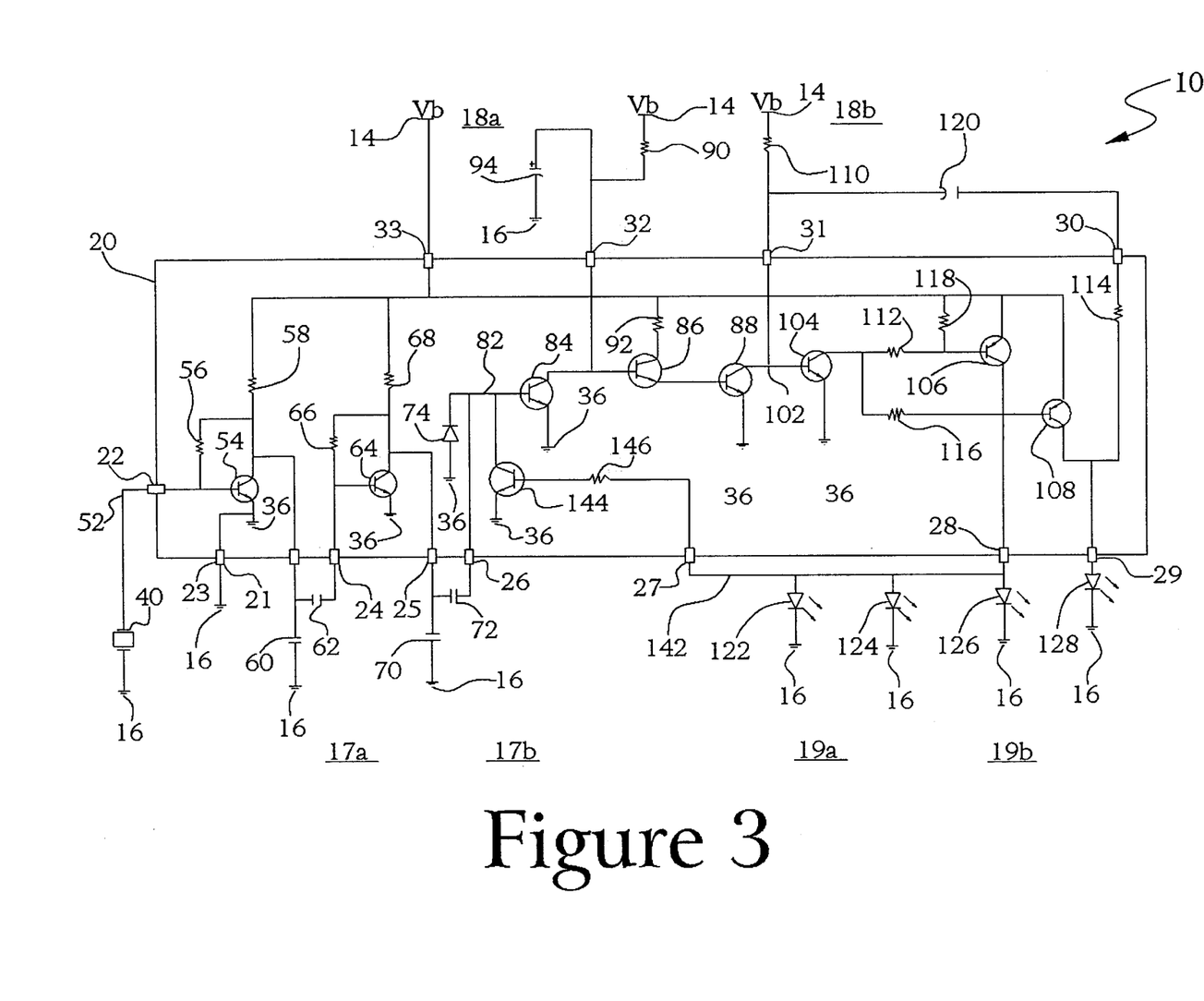
FIG. 3 is a schematic diagram of the ASIC electronic circuit.

A multi-purpose safety light 10 constructed in accordance with the present invention is illustrated in FIGS. 1–3.

Referring to the accompanying drawings, FIG. 1 illustrates a safety light 10 comprising generally a system power source 12, a motion sensor 40, an ASIC electronic circuit 20, and a series of external components, including filter components 17, timer components 18, and light emitting diode components 19. System power source 12 provides a system power voltage 14 to the ASIC electronic circuit 20 and timing components 18, and a system power return 16 to the ASIC electronic circuit 20, external filter components 17, light emitting diode components 19, and motion sensor 40. System power source 12 may range from 1.8 volts DC to 12 volts DC. A typical system power source 12 may consist of a series combination of two standard size 'AA' batteries resulting in a system power voltage of three volts.

ASIC electronic circuit 20 further comprises a motion sensor amplifier 50, a timer 80, a light emitting diode (LED) driver 100, and a photo-amplifier 140.

Next, referring to FIG. 2, motion sensor 40 comprises a standard piezoelectric element. As shown, a typical piezoelectric element further comprises a mass 42 attached to a piezoelectric crystal element 44, both enclosed within a supporting structure 46. Only the base 48 of piezoelectric crystal element 44 is attached to supporting structure 46 allowing the remaining sides of crystal element 44 and the mass 42 to freely move within the supporting structure 46. In response to movement, the mass 42 exerts an inertial force on the piezoelectric crystal element 44 which, in turn, produces a proportional charge on the crystal element 44. Since the piezoelectric crystal element 44 has an amount of inherent capacitance, the charge produced by the crystal also provides a proportional output voltage (Vout) 49 provided externally to the supporting structure 46 by two leads 45 attached to opposite ends of crystal 44 and passing through opening 47 in support structure 46. As discussed below, this output voltage 49 is provided to an ASIC electronic circuit 20 as an input 52.

Next, referring to FIG. 3, system power voltage 14 is provided to the ASIC electronic circuit 20 via a pin 33. System power return 16 is provided to the ASIC electronic circuit 20 via a pin 21.

When motion is sensed, the motion sensor 40 generates and provides a voltage as an input 52 to the base of the transistor 54 via a pin 22. A resistor 56 is connected between the base of transistor 54 and the collector of transistor 54. One end of a resistor 58 is connected to the collector of transistor 54. The other end of resistor 58 is connected to power supply voltage 14 via a pin 33. The emitter of transistor 54 is connected to a common ground 36 of ASIC electronic circuit 20. Additionally, the collector of transistor 54 is connected to one side of a capacitor 60 and one side of a capacitor 62 via a pin 23. The opposite end of capacitor 60 is connected to system power ground 16. The opposite end of capacitor 62 is connected to the base of a transistor 64 via a pin 24. A resistor 66 is connected between the base of transistor 64 and the collector of transistor 64. One end of a resistor 68 is connected to the collector of transistor 64. The other end of resistor 68 is connected to system power voltage 14 via pin 33. The emitter of transistor 64 is connected to common ground 36 of ASIC electric circuit 20. Additionally, the collector of transistor 64 is connected to one side of a capacitor 70 and one side of a capacitor 72 via a pin 25. The opposite end of capacitor 70 is connected to system power ground 16. The opposite end of capacitor 72 via a pin 25. The opposite end of capacitor 70 is connected to system power ground 16. The opposite end of capacitor 72 is connected to the cathode of a diode 74 via a pin 26 and is provided to the timer 80 as an input 82. The anode of diode 74 is connected to common ground 36.

In operation, transistor 54 along with resistor 56, resistor 58, capacitor 60, and capacitor 62 amplify and condition input 52. Under steady-state conditions transistor 54 is biased by resistor 56 and resistor 58 using a collective feedback technique which allows transistor 54 to converge to a semi-on state without regard to the system power voltage 14, subject to a minimum system power voltage 14 requirement of approximately 1.8 volts DC. Resistor 56 and resistor 58 values are selected to minimize power dissipation during steady-state operation. Thus, a resistor 56 value of 3 megaohms, a resistor 58 value of 1 megaohm and a system power voltage 14 of 3 volts results in a steady-state current of several microamperes, typically 3 microamperes.

Under dynamic operation an alternating signal is provided by the motion sensor 40 as input 52 to the motion sensor amplifier 50. The alternating input 52, in turn, causes transistor 54 to be biased on and off resulting in the collector voltage of transistor 54 to move from a steady-state semi-on value and swing from approximately the value of the system power voltage 14 and common ground 36. More specifically, considering a sinusoidal signal at input 52, in response to an increasing positive voltage greater than 0.6 volts at input 52, transistor 54 enters a conducting mode where the collector voltage of transistor 54 is approximately equal to common ground 36. As the sinusoidal signal at input 52 decreases to a value less than 0.6 volts, transistor 54 becomes biased off and the collector voltage of transistor 54 approaches the value of the system power voltage 14. Resistor 58 and capacitor 60 form a low pass filter which restricts system response to approximately 16 kilohertz with the resistor 58 value of one megaohm and the capacitor 60 value of 0.1 microfarads. Capacitor 62 couples the amplified alternating signal at the collector of transistor 54 to the base of transistor 64. Capacitor 62 typically has a value of 0.1 microfarads.

In a similar fashion with respect to transistor 54, resistor 66 and resistor 68 bias transistor 64 using a collective feedback technique. Typically, resistor 66 has a value of 3 kilo-ohms and resister 68 has a value of one megaohm. Capacitor 70 and resistor 68 form a low pass filter which restricts system response to approximately 16 kilohertz with the resistor 68 value of one megaohm and the capacitor 70 value of 0.1 microfarad. Capacitor 72 couples the alternating signal at the collector of transistor 64 to the input 82 of the timer 80. Diode 74 rectifies the input 82 of the timer 80 preventing the input 82 voltage from decreasing below approximately −0.6 volts, the diode 74 forward conducting voltage, protecting the base input of a transistor 84 while allowing capacitor 72 to hold a suitable charge to provide an input 82 to the timer 80. Transistor 54 and transistor 64 are type 2N3904. Diode 74 is type 1N4148.

Timer 80 receives input 82 at the base of transistor 84. The emitter of transistor 84 is connected to common ground 36. The collector of transistor 84 is connected to the base of a transistor 86. Additionally, the collector of transistor 84 is connected to one end of a resistor 90 and to the positive side of a polarized capacitor 94 via a pin 32. The other end of resistor 90 is connected to system power voltage 14. The negative terminal of polarized capacitor 94 is connected to system power ground 16. The collector of transistor 86 is connected to one end of a resistor 92. The other end of resistor 92 is connected to system power voltage 14 via pin 33. The emitter of transistor 86 is connected to the base of a transistor 88. The emitter of transistor 88 is connected to common ground 36. The collector of transistor 88 is connected to the base of a transistor 104 providing an input 102 to the LED driver 100.

In operation, under steady-state conditions, input 82 is approximately zero volts and transistor 84 is biased off. Capacitor 94 charges to a value equal to system power voltage 14. Charge timing is a function of resistor 90 and capacitor 94 values. With the resistor 90 value of 4.7 kilo-ohms and the capacitor 94 value of 47 microfarads the voltage at the collector of transistor 84 will charge to 0.6 volts in approximately 50 seconds, given a system power voltage (Vb) of three volts. As the base voltage of transistor 86 increases from zero volts to a value greater than 0.6 volts, transistor 86 transitions from a biased-off state to a biased-on state. With transistor 86 biased on, collector current through transistor 86 is allowed to flow, limited by resistor 92 which has a value of one megaohm, resulting in transistor 88 to be biased on, disabling the LED driver 100.

Under dynamic conditions, when an alternating signal present at input 82 provided by the motion sensor amplifier 50 reaches approximately 0.6 volts, transistor 84 is biased on allowing capacitor 94 to discharge. As capacitor 94 discharges the base voltage of transistor 86 decreases to approximately zero volts, biasing transistor 86 off and, in turn, biasing transistor 88 off, thus enabling the LED driver 100. When the input 82 decreases below approximately 0.6 volts, the voltage at the base of transistor 86 increases as a function of resistor 90 and capacitor 94. During this charging of capacitor 94, the time 80 can be retriggered with an input 82 which reaches approximately 0.6 volts, biasing transistor 84 on, discharging capacitor 94. Transistor 84, transistor 86, and transistor 88 are type 2N3904.

LED driver 100 receives collector voltage of transistor 88 from the timer 80 as input 102. The collector of transistor 88 is connected to the base of a transistor 104, and to one end of a resistor 110 and to the negative side of a polarized capacitor 120 via a pin 31. The other end of resistor 110 is connected to system power voltage 14. The emitter of transistor 104 is connected to common ground 36. The collector of transistor 104 is connected to one end of a resistor 112 and to one end of a resistor 116. The other end of resistor 112 is connected to the base of a PNP transistor 106 and one end of a resistor 118. The other end of resistor 118 is connected to system power voltage 14 via pin 33. The other end of resistor 116 is connected to the base of a PNP transistor 108. The emitter of transistor 106 and the emitter of transistor 108 are connected to system power voltage 14 via pin 33. The collector of transistor 108 is connected to one end of a resistor 114 and to the anode of a light emitting diode 128 via a pin 29. The other end of resistor 114 is connected to the positive side of capacitor 120 via a pin 30. The collector of transistor 106 is connected in a parallel fashion to the anodes of a light emitting diode 126, a light emitting diode 124, and a light emitting diode 122 via a pin 28.

In operation, under steady-state conditions where no input 52 exists such that the collector voltage of transistor 88 is zero volts, transistor 104 is biased off. With transistor 104 biased off the base voltage of PNP transistor 106 and PNP transistor 108 is equal to supply power voltage 14 inhibiting PNP transistor 106 and PNP transistor 108 from conducting.

Under dynamic conditions, transistor 104 and PNP transistor 108 form an astable multivibrator whose period of operation is determined by resistor 110 and polarized capacitor 120 while the pulse width is determined by resistor 114 and polarized capacitor 120. When timer 80 is activated by a dynamic input 52, transistor 88 will be biased off and allow the voltage at the base of transistor 104 to increase as a function of resistor 110 and polarized capacitor 120. When the input 102 reaches the appropriate voltage, transistor 104 is biased on reducing the base voltage of PNP transistor 106 and PNP transistor 108. With a base voltage of approximately zero volts, the PNP transistor 106 is biased on allowing current to flow through and illuminating LED 122, LED 124, and LED 126. With a base voltage of approximately zero volts, the PNP transistor 108 is biased on allowing current to flow through and illuminate LED 128. With PNP transistor 108 biased on, the collector voltage of PNP transistor 108 becomes approximately system power voltage 14, charging polarized capacitor 120 through resistor 114. In response to the increasing voltage at the positive end of polarized capacitor 120, the base voltage of transistor 104 decreased returning transistor 104 to a biased-off state and disabling the illumination of LED 122, LED 124, and LED 126. As the base voltage of transistor 104 increases as a function of resistor 110 and polarized capacitor 120, transistor 104 becomes once again biased on and the oscillatory LED flashing cycle begins once again. Transistor 104 is type 2N3904. PNP transistor 106 and PNP transistor 108 are type 2N3906.

When LED driver 102 is disabled by the timer 80, light emitting diodes 122, 124, and 126 form a voltage source for the photo-amplifier 140. The anodes of light emitting diodes 122, 124, and 128 are connected in parallel fashion to one end of a resistor 146 via a pin 27. The other end of resistor 146 is connected to the base of a transistor 144. The emitter of transistor 144 is connected to common ground 36. The collector of transistor 144 is connected to the base of transistor 84 forming an additional input 82 source to the timer 80.

In operation, the light emitting diodes 122, 124, and 126 are selected to produce approximately one volt DC when illuminated by light. The parallel combination provides the requisite current to bias transistor 144 on. Resistor 146 limits the base current of transistor 144. Typically, resistor 146 has a value of one kilo-ohms. When transistor 144 is biased on, capacitor 72 is discharged through transistor 144 resulting in input 82 being held at approximately zero volts which, in turn, disables the timer 80 and ultimately the LED driver 100.

Thus, under low light conditions, when the safety light is attached to a moving object, physical motion is sensed and converted into an electrical signal by the motion sensor. This signal is then conditioned by the motion sensor amplifier and used to trigger the timer. The timer triggers and enables the LED driver which, in turn, responds by flashing the LED devices. The flash rate and duty cycle are defined by the LED driver. The LED devices continue to flash for a period defined by the timer. During this time period the timer may be re-triggered where the LED devices may flash indefinitely. If, however, the LED devices detect sufficient light, the timer will be inhibited after the previous time period is completed.

Figure 4:
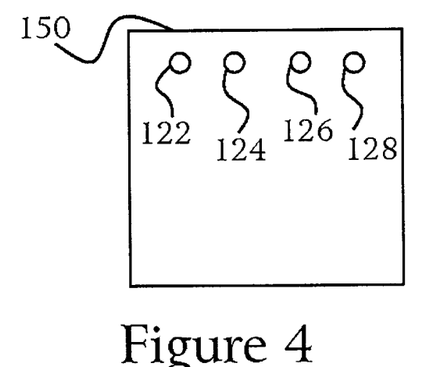
FIG. 4 is a top view of the housing of the inventive design.
Figure 5:
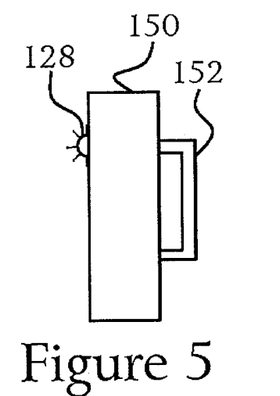
FIG. 5 is a right side view of the housing of the inventive design.
Figure 6:
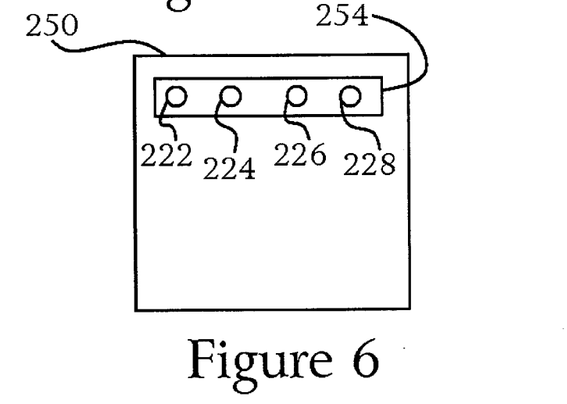
FIG. 6 is a rear view of the housing of the inventive design.

Now referring to FIGS. 4, 5, and 6, a housing 150 of the inventive design is shown. LED 122, LED 124, LED 126, and LED 128 are shown mounted longitudinally on the surface of the housing, however, various other arrangements may be considered. Referring more specifically to FIGS. 5 and 6, a strap support member 152, as part of the housing, is shown. A strap is passed through the openings of the strap support member 152, and then secured to an individual, pet, or object.

Figure 7:
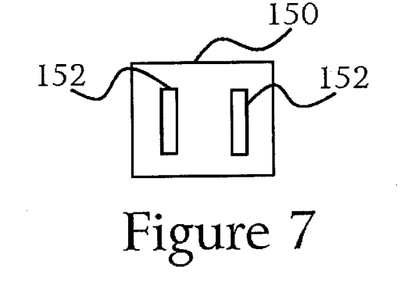
FIG. 7 is a top view of an alternative embodiment of the housing of the inventive design.
Figure 8:
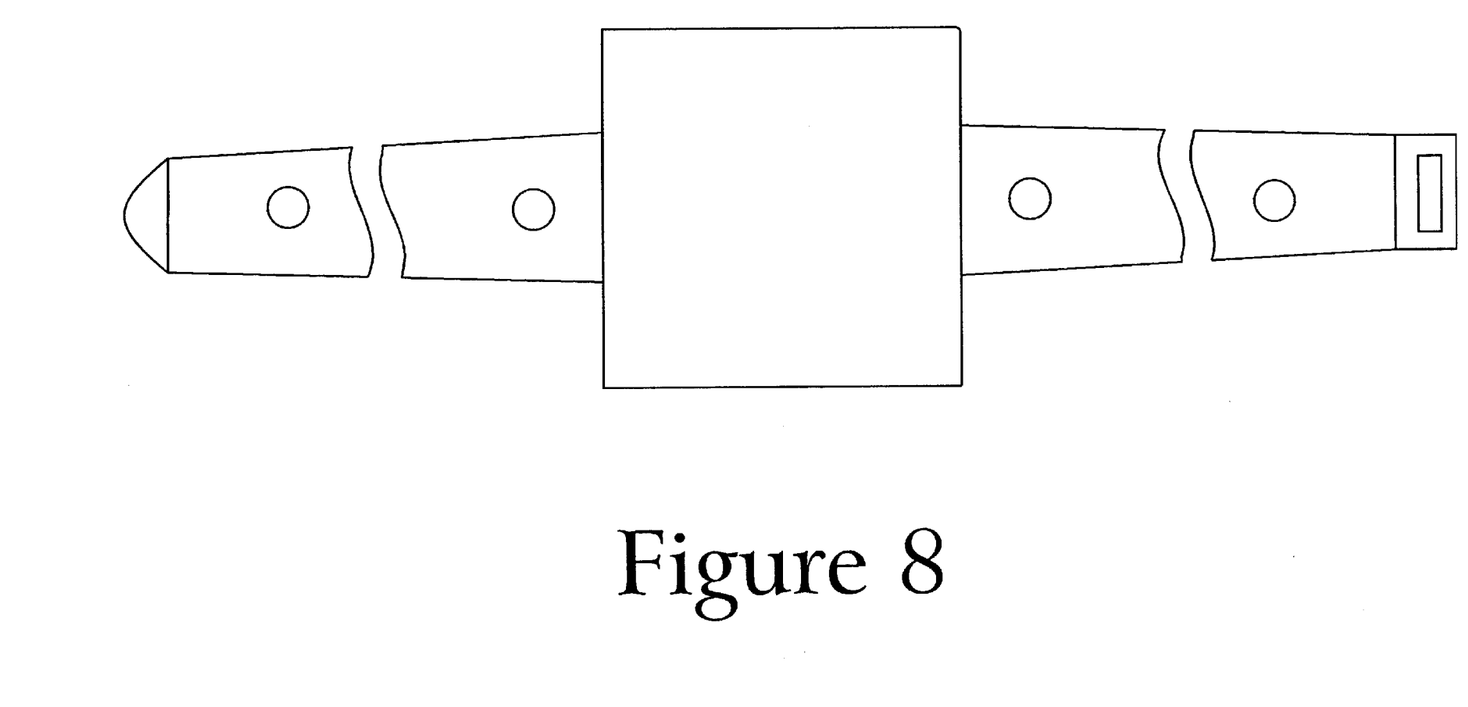
FIG. 8 is a top view of an alternative embodiment of the housing of the inventive design.

Now referring to FIG. 7, a housing 250 of an alternative embodiment is shown. An LED 222, an LED 224, an LED 226, and an LED 228 are mounted within the housing 250. Visible light produced from and received by the LED devices passes through a transparent window 254.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A motion activated and light sensitive multi-purpose safety light, comprising:
   (a) a housing;
   (b) a support for supporting said housing;
   (c) a motion sensor mounted within said housing;
   (d) a light emitting diode serving as a light source, said light emitting diode supported by said housing;
   (e) an electronic circuit mounted within said housing, said circuit comprising:
      i. a motion sensor amplifier providing conditioning for a motion signal received from said motion sensor;
      ii. a driver for illuminating said light emitting diode in a flashing manner;
      iii. a timer enabling the operation of said driver for a period of time; and
      iv. a photo-amplifier, said photo-amplifier providing amplification of an input signal, said input signal being received from said light emitting diode and is used to disable said timer; and
   (f) a system power source mounted within said housing.

2. A safety light according to claim 1, wherein said light emitting diode serves as a light source and a light detector.

3. A safety light according to claim 1, wherein said multi-purpose safety light further comprises a user-selected discrete electrical components providing control over parameters related to said conditioning.

4. A safety light according to claim 1, wherein said multi-purpose safety light further comprises a user-selected discrete electrical components providing control of said light emitting diode flash rate.

5. A safety light according to claim 3, wherein said multi-purpose safety light further comprises a user-selected discrete electrical components providing control of said light emitting diode flash rate.

6. A safety light according to claim 5, wherein said multi-purpose safety light further comprises a printed circuit board providing an area to mount said discrete electrical components and electric circuit.

7. A safety light according to claim 2, wherein said light emitting diode is mounted within said housing and said housing is provided with an opening, said opening positioned on said housing to permit light to enter and exit said housing.

8. A safety light according to claim 7, wherein said opening supports a lens and said lens being transparent to visible light.

9. A safety light according to claim 3, wherein said light-emitting diode further comprises a plurality of light emitting diodes.

10. A motion activated and light sensitive multi-purpose safety light, comprising:
    (a) a housing;
    (b) a support for supporting said housing;
    (c) a motion sensor mounted within said housing;
    (d) a light emitting diode serving as a light source and a light detector, said light emitting diode supported by said housing;
    (e) an electronic circuit mounted within said housing, said circuit comprising:
       i. a motion sensor amplifier providing conditioning for a motion signal received from said motion sensor;
       ii. a driver for illuminating said light emitting diode in a flashing manner;
       iii. a timer enabling the operation of said driver for a period of time; and
       iv. a photo-amplifier, said photo-amplifier providing amplification of an input signal, said input signal being received from said light emitting diode and is used to disable said timer; and
    (f) a user-selected discrete electrical components providing control over parameters related to said conditioning;
    (g) a user-selected discrete electrical components providing control of said light emitting diode flash rate;
    (h) a printed circuit board providing an area to mount said discrete electrical components and electric circuit; and
    (i) a system power source mounted within said housing.

11. A safety light according to claim 10, wherein said light emitting diode is mounted within said housing and said housing is transparent to visible light.

12. A safety light according to claim 10, wherein said support comprises an adjustable strap, said strap having a first and second ends, said first end having a mechanism for securing said first end to said second end, providing for attachment of said safety light to an individual, pet, or object.

13. A safety light according to claim 10, wherein said support comprises an adjustable receiving area, said receiving area being configured, dimensioned and positioned to mount said safety light onto a spoke of a bicycle wheel.

14. A safety light according to claim 10, wherein said support has adhesive affixed on the surface of said support, said adhesive allows for mounting on said support on an object.

15. A safety light according to claim 10, wherein said motion sensor is a piezoelectric element type.

16. A safety light according to claim 10, wherein said electronic circuit is constructed as an application specific integrated circuit (ASIC) device.

17. A safety light according to claim 10, wherein said conditioning consists of signal filtering and amplification.

18. A safety light according to claim 17, wherein said signal filtering consists of one or more highpass filters.

19. A safety light according to claim 10, wherein said system power source consists of an arrangement of one or more batteries.

20. A safety light according to claim 19, wherein said battery is a three volt lithium coin cell type CR2032.

21. A safety light according to claim 10, wherein said system power source consists of a solar cell mounted to said system.

22. A motion activated and light sensitive multi-purpose safety light, comprising:
- (a) a housing, said housing having an opening, said opening allows the transmission of visible light into and from within the housing;
- (b) a support for supporting said housing;
- (c) a printed circuit board mounted within said housing;
- (d) a motion sensor mounted to said printed circuit board;
- (d) a visible light transceiver mounted to said printed circuit board;
- (e) a microcontroller mounted to said circuit board, said microcontroller being programmed to interpret input signals received from said motion sensor and said light transceiver, said microcontroller causing said light transceiver to flash said visible light transceiver when said input signals are received;
- (f) a system power source; and
- (g) a crystal-based timing circuit required to operate said microcontroller.

23. A signal emitting device, comprising a signal emitting component and a motion sensor for activating said signal emitting component, said motion sensor comprising, a piezoelectric crystal element, said piezoelectric crystal element being attached to a mass at a first point and to a support structure at a second point, said support structure being attached to a body whose motion is to be detected, said first point being positioned relative to said second point to result in the application of a positive or negative compression to said piezoelectric crystal element when said body whose motion is to be detected moves, causing said piezoelectric crystal element to respond to such compression with an electrically detectable change in characteristics.

24. A signal emitting device as in claim 23, wherein said structure is an enclosed structure.

25. A signal emitting device as in claim 23, wherein said signal emitting component is a light emitting diode and said light emitting diode is a light sensing component, said signal emitting device being disabled when light in excess of a predetermined magnitude falls on said light emitting diode.

26. A signal emitting device as in claim 25, further comprising a housing, said housing supporting said light emitting diode, said motion sensor and an electronic circuit, said housing being attached to a body whose motion is to be detected, said circuit being in communication with said light emitting diode and said piezoelectric crystal element, said circuit comprising:
- i. a motion sensor amplifier providing conditioning for a motion signal received from said piezoelectric crystal element;
- ii. a driver for illuminating said light emitting diode in a flashing manner;
- iii. a timer enabling the operation of said driver for a period of time; and
- iv. a photo-amplifier, said photo-amplifier providing amplification of an input signal, said input signal being received from said light emitting diode and is used to disable said timer; and
- a system power source mounted within said housing.

27. A signal emitting device as in claim 26, wherein said light emitting diode is a plurality of light emitting diodes.

28. A signal emitting device as in claim 27, wherein said plurality of light emitting diodes are a light sensing component, said signal emitting device being disabled when light in excess of a predetermined magnitude falls on said plurality of said light emitting diodes.

29. A signal emitting device as in claim 23, wherein said signal emitting component is an electronic excitation circuit incorporating a light emitting diode, and said light emitting diode produces a voltage in response to ambient light, said voltage disabling said electronic excitation circuit, whereby said signal emitting device only operates in relative darkness.

30. A signal emitting device as in claim 23, wherein said mass is capable of movement in response to forces having vector components orthogonal to each other.

31. A signal emitting device as in claim 23, wherein said mass and said motion sensor is capable of movement in response to forces having vector components orthogonal to each other.

32. A signal emitting device as in claim 23, wherein said mass is capable of movement in response to forces having more than one vector component.

33. A signal emitting device as in claim 23, wherein said mass and said motion sensor are capable of movement in response to forces having more than one vector component.

* * * * *